D. J. POWERS.
Assignor to UNION WIRE MATTRESS CO.
SOFA-BEDSTEAD.
No. 7,518. Reissued Feb. 20, 1877.
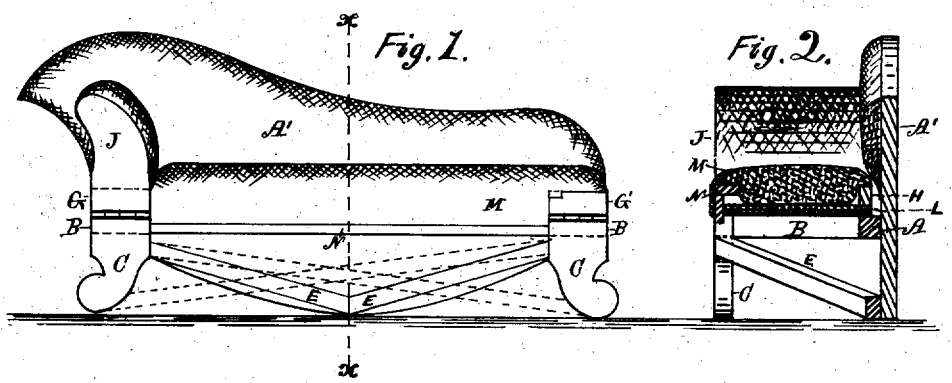
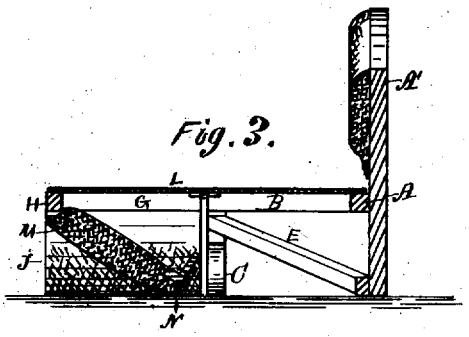
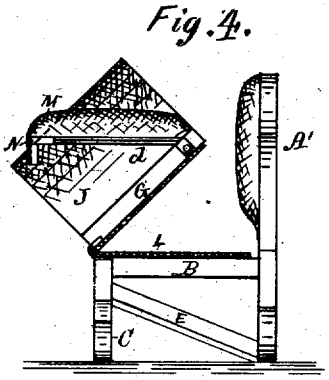
Witnesses:
N. H. Sherburne
N. Cowles
Inventor:
David J. Powers
By Finley & Sherburne
Attys.
N. PETERS, PHOTO-LITHOGRAPHER, WASHINGTON, D. C.

UNITED STATES PATENT OFFICE.

DAVID J. POWERS, OF CHICAGO, ILLINOIS, ASSIGNOR TO UNION WIRE MATTRESS COMPANY, OF SAME PLACE.

IMPROVEMENT IN SOFA-BEDSTEADS.

Specification forming part of Letters Patent No. 170,687, dated December 7, 1875; reissue No. 7,518, dated February 20, 1877; application filed January 8, 1877.

*To all whom it may concern:*

Be it known that I, DAVID J. POWERS, of Chicago, in the county of Cook and State of Illinois, have invented certain new and useful Improvements in Bed-Lounges; and I do hereby declare the following to be a full, clear, and exact description thereof, which will enable others skilled in the art to which my invention appertains to make and use the same, reference being had to the accompanying drawing, forming part of this specification, in which—

Figure 1 represents a front elevation of a bed-lounge, embodying my said invention. Fig. 2 represents a transverse section of the same, taken on the line *x x* in Fig. 1, when folded. Fig. 3 represents a transverse section when unfolded; and Fig. 4 represents an end view of the same when partly folded.

Like letters of reference indicate like parts.

The object of my invention is to improve the construction of bed lounges or sofas, so as to render their use, as a bed, more desirable and complete; and to that end my invention consists, first, in the combination, with the folding end rails of a lounge or sofa, of a wire-fabric bed-bottom, attached at its ends to the said rails, and so adjusted as to fold with them and lengthwise of the fabric, and so that the tension of the fabric is not at all times the same; second, in so constructing the main framework of the lounge or sofa as to dispense with a central longitudinal rail under the fabric when unfolded, whereby the fabric is left free to spring down under the weight of the occupant without coming in contact with the frame; and, third, in so constructing the cushion that it can fall away, or be removed, from the under side of the fabric when the lounge is unfolded, and readily returned to its place when the lounge is folded.

In the drawing, A represents the back rail of the lounge, and A′ the back, which is upholstered in the usual manner, and firmly secured to the rail A by any suitable means. B B are the end rails of the main frame-work of the lounge, and are permanently secured at one end to the back rail A at its ends. C C are the feet, respectively attached to the rails B B at the end opposite to the back, to support the front of the lounge. E E are braces, connected at one end to the feet, immediately below the rails B B, and extend obliquely downward and backward to the center of the back, as shown in Fig. 1, and support said rails, so as to prevent them from being drawn toward each other by the strain of the fabric constituting the bed-bottom. G G′ are the end rails of the folding part of the lounge, and one end of each is hinged to end rails B B, respectively, in such a manner as to rest upon them when folded, and each is permanently attached at the end opposite to the hinge to a longitudinal rail, H, that forms the front rail of the lounge when unfolded. J is the framework, constituting the head of the lounge, and is permanently attached to the rail G, and is upholstered in the usual manner. L is a web or fabric, which is permanently attached at its ends to the end rails B B and G G, and is of the proper width to extend across the entire surface of the lounge when unfolded, and so as to form the bottom on which the bed or mattress is supported. M is the cushion, which forms the seat when the lounge is folded, and is provided with a longitudinal rail, N, arranged within its front edge, and extending its entire length, and at each end with a transverse bar, *d*, extending across the cushion. Each of said bars is connected at one end to the rail N, and is hinged at its opposite end to the end rails G G′, respectively, at a point near the rail H. The arrangement of said cushion is such that when the lounge is folded the rear edge of the cushion is supported upon rail H, and the front upon rail N, and the center above or upon the fabric L; and when the lounge is unfolded the gravity of the cushion will cause it to drop away from the rails G G′ and the fabric, so as to allow the fabric to freely spring down under the weight of the occupant without coming in contact with or resting upon the cushion; and by arranging the braces E E below the end rails B B, the said end rails are prevented from being drawn inward toward each other by the strain of the fabric, while at the same time the fabric can freely spring down without coming in contact with or resting upon the braces.

I do not confine myself to any particular kind of fabric for the bed-bottom. In practice I usually use a webbing or wire fabric composed of interlocked coils, which I attach at its ends to the end rails of the lounge, and without attaching the sides thereof to the frame-work, as the fabric has more elasticity when attached only at its ends; but, if desired, it may be attached at both its ends and sides. When this wire fabric is used the back rail A may be dispensed with, since, the web being attached at the ends only, no back rail is needed for the attachment of the web.

I have shown and described the braces E E as meeting in the center of the back; but I do not confine myself to arranging them in that manner, or in any particular angle, as I sometimes continue them from the lower surface of the rails B B diagonally across to the bottom of the feet at the back of the lounge, as shown by dotted lines in Fig. 1, the object being to support the end rails against the tension of the fabric by means of braces which are out of the way of the downward spring of the fabric.

It will be observed, by reference to Fig. 2 of the drawing, that the lower edge of rail N of the cushion drops below the front of the web forming the bed-bottom, and is upholstered on its front side, the object being to form a complete finish on the front of the lounge when folded, and so as to conceal the bed-bottom.

Having thus described my invention, what I claim as new, and desire to secure by Letters Patent, is—

1. The combination, with the end rails B B and G G′ of a folding lounge or sofa, of the wire-fabric bed-bottom L, attached at its ends to the said rails, and adjusted to fold with the rails G G′, and lengthwise of the fabric, substantially as and for the purpose specified.

2. The combination, with the end rails B B and G G′, of the braces E E, substantially as and for the purpose specified.

3. The cushion M, hinged to the end rails G G′, and adapted to drop away from the fabric L when the lounge is unfolded, and to rest upon or above the fabric when folded, substantially as specified.

DAVID J. POWERS.

Witnesses:
N. C. GRIDLEY,
N. H. SHERBURNE.